Patented July 11, 1933

1,917,380

UNITED STATES PATENT OFFICE

CARL J. MALM AND JAMES D. COLEMAN, JR., OF ROCHESTER, NEW YORK, ASSIGNORS TO EASTMAN KODAK COMPANY, OF ROCHESTER, NEW YORK, A CORPORATION OF NEW YORK

PROCESS OF MAKING CELLULOSE NITRATE-ACYLATE

No Drawing. Application filed December 31, 1930. Serial No. 505,969.

This invention relates to a process of making cellulose nitrate-acylate in which the cellulose is acylated with insufficient acyl-anhydride to completely esterify the cellulose and the acylated cellulose formed is nitrated in the residual reaction mixture with fuming nitric acid or an oxide of nitrogen.

An object of the invention is to provide a more economical process of producing cellulose nitrate-acylate than many known at the present time. In this novel process it is necessary only to use a reduced amount of acyl anhydride to procure the acylation of the cellulose to render it suitable for nitration as carried out by our process. Heretofore, according to the prior art such, for instance, as the British Patent #283,595, corresponding to U. S. Patent #1,783,771, it has been thought necessary to use from three to four times as much acetic anhydride as cellulose when the nitration was carried out by nitric acid during the course of the acetylation, that patentee quite apparently having the idea that full acetylation of the cellulose by an excess of anhydride was necessary. Contrasted to that, our invention comprises not quite fully acylating the cellulose and then substituting nitrate radicals for the remaining esterifiable hydroxyl groups without following the nitration with further acylation.

It has also been previously known to produce cellulose nitrate acetate by first nitrating the cellulose and then acetylating, or by acetylating and nitrating simultaneously. When the cellulose is first nitrated and then acetylated, two separate steps are obviously necessary. When the acetylation and nitration are carried out simultaneously, the process is difficult to control and a rather large excess of acetic anhydride is necessary as evidenced by the foregoing prior art.

We have now found that cellulose nitrate-acylate can be manufactured very readily and at a low cost if the cellulose is not quite fully acylated and then nitrated, the nitration being carried out successfully in the same reaction mixture. The cellulose is first incompletely acylated (in the case of acetylation up to about 40–42% acetyl) before it is nitrated. This incomplete acylation can be accomplished by carrying it out in the presence of quantities of acyl anhydride which are insufficent to give a full tri-acylate i. e., less than approximately two times the weight of the cellulose in acetic anhydride or a similar ratio of other acylating agent. A very grainy, highly viscous, semi-solution of the cellulose acylate is thus obtained. To this solution is then added nitric acid, fuming nitric acid or an oxide of nitrogen such as $N_2O_3$, $NO_2$ or $N_2O_4$, or $N_2O_5$ (either in liquid or gaseous form), which esterifies the remaining free hydroxl groups. In using this method an appreciable amount of anhydride is saved.

An illustration of one way of carrying out of our invention as applied to the making of cellulose nitrate-acetate is as follows: About 100 lbs. of cellulose is treated with a mixture of approximately 500 lbs. of acetic acid and 2 lbs. of sulphuric acid for 2–5 hours at 90–120° F. The reaction mixture is then preferably cooled to about atmospheric temperature or a little above, and about 170 lbs. of acetic anhydride is added. The temperature is then allowed to rise to 90–120° F. which usually takes about 3–4 hours, which temperature is maintained until all fibers have disappeared and a viscous, grainy solution is obtained. To this may then be added a mixture of about 18–24 lbs. of fuming nitric acid or liquid $NO_2$ and about 40 lbs. of acetic acid. A short time after the addition of this nitration agent (usually about 1 hour) the dope becomes very clear and brilliant and is free from grain. The cellulose ester may be then either isolated in its highly esterified form or hydrolyzed to acetone solubility in the usual manner before the precipitation.

Any of the fatty acid anhydrides or the like such as ordinarily used to acylate cellulose may be used instead of acetic anhydride. The same proportion of this anhydride to the full acylation formula therefor may be used as corresponds to the proportion of acetic anhydride to the full formula used in the example. Some of the anhydrides that are suitable are propionic, butyric, lauric, stearic, benzoic, or the like. Although cotton linters is the preferred form of cellulose for use in our process, any cellulosic material which is compatible with the steps of this invention may be used. For instance, scrap cotton cloth, long fibered cotton, various forms of cellulose and various wood pulps may be used.

Also other commonly known acylation catalysts than sulphuric acid come within the contemplation of our invention. Among these may be mentioned zinc chloride, magnesium perchlorate, bromine, para-toluene sulfo-chloride and the like.

Instead of the acylation reaction given, other means of partially acylating the cellulose may be used, such as using the acyl chloride as the acylating agent, using the fatty acid and an impeller such as chloracetic anhydride or any other means disclosed in the art. One of the important features of our invention which clearly distinguishes it from prior known processes is the fact that the cellulose is not quite fully acylated and after the acylation mixture has exhausted itself, nitration is then accomplished, no further acylation thereafter being employed.

What I now claim and desire to secure by Letters Patent of the United States is:

1. A process of making cellulose nitrate-acylate which comprises acylating cellulose to form a cellulose acylate having less than 3 acyl groups and then further esterifying the resulting partially acylated cellulose with a nitrating agent only.

2. A process of making cellulose nitrate-acylate which comprises acylating cellulose to form a cellulose acylate having less than 3 acyl groups with an amount of acyl containing anhydride less than required to fully acylate the cellulose and then further esterifying the resulting cellulose acylate with a nitrating agent only.

3. A process of making cellulose nitrate-acylate which comprises acylating cellulose to form a cellulose acylate having less than 3 acyl groups with an amount of an acyl-containing anhydride insufficient to fully acylate the cellulose and then fully esterifying the resulting product only with a nitrating agent selected from the group consisting of nitric acid, fuming nitric acid $NO_2$, $N_2O_4$, $N_2O_3$ and $N_2O_5$.

4. A process of making cellulose nitrate-acetate which comprises acetylating cellulose to form a cellulose acylate having less than 3 acyl groups and then fully esterifying the resulting partially acetylated cellulose with a nitrating agent only.

5. A process of making cellulose nitrate-acetate which comprises acetylating cellulose to form a cellulose acylate having less than 3 acyl groups with an amount of acetic anhydride less than approximately two times the amount of the cellulose and then only nitrating the resulting partial cellulose acetate.

6. A process of making cellulose nitrate-acetate which comprises acetylating cellulose to form a cellulose acylate having less than 3 acyl groups with an amount of acetic anhydride insufficient to fully acetylate the cellulose then further esterifying the resulting product only with a nitrating agent selected from the group consisting of nitric acid, fuming nitric acid, $NO_2$, $N_2O_4$, $N_2O_3$ and $N_2O_5$.

7. A process of making cellulose nitrate-acylate which comprises acylating cellulose to form a cellulose acylate having less than 3 acyl groups with an amount of an acyl containing anhydride less than that necessary to fully acylate the cellulose and then further esterifying the resulting partial cellulose acylate with fuming nitric acid only.

8. A process of making cellulose nitrate-acylate which comprises acylating cellulose to form a cellulose acylate having less than 3 acyl groups with an amount of an acyl containing anhydride less than that necessary to fully acylate the cellulose and then further esterifying the resulting partial cellulose acylate with nitrogen dioxide only.

9. A process of making cellulose nitrate-acylate which comprises acylating cellulose to form a cellulose acylate having less than 3 acyl groups with an amount of an acyl containing anhydride less than that necessary to fully acylate the cellulose and then further esterifying the resulting partial cellulose acylate with nitric acid only.

Signed at Rochester, N. Y., this 29th day of December 1930.

CARL J. MALM.
JAMES D. COLEMAN, Jr.